(12) United States Patent
Boucadair et al.

(10) Patent No.: US 10,164,851 B2
(45) Date of Patent: Dec. 25, 2018

(54) TRANSMISSION AND RECEPTION OF A DIAGNOSTIC REQUEST IN AN IP NETWORK

(71) Applicant: Orange, Paris (FR)

(72) Inventors: Mohamed Boucadair, Betton (FR); Christian Jacquenet, Pont-pean (FR)

(73) Assignee: ORANGE, Paris (FR)

( * ) Notice: Subject to any disclaimer, the term of this patent is extended or adjusted under 35 U.S.C. 154(b) by 167 days.

(21) Appl. No.: 15/107,864

(22) PCT Filed: Dec. 12, 2014

(86) PCT No.: PCT/FR2014/053304
§ 371 (c)(1),
(2) Date: Jun. 23, 2016

(87) PCT Pub. No.: WO2015/097359
PCT Pub. Date: Jul. 2, 2015

(65) Prior Publication Data
US 2016/0323165 A1 Nov. 3, 2016

(30) Foreign Application Priority Data
Dec. 23, 2013 (FR) ..................................... 13 63426

(51) Int. Cl.
*H04L 12/26* (2006.01)
*H04L 12/723* (2013.01)
*H04L 12/24* (2006.01)

(52) U.S. Cl.
CPC ...... *H04L 43/0817* (2013.01); *H04L 41/0636* (2013.01); *H04L 43/00* (2013.01);
(Continued)

(58) Field of Classification Search
CPC ................. H04L 43/0817; H04L 45/50; H04L 41/0636; H04L 43/12; H04L 43/00; H04L 43/50
See application file for complete search history.

(56) References Cited

U.S. PATENT DOCUMENTS

| | | | |
|---|---|---|---|
| 6,457,143 B1 | 9/2002 | Yue | |
| 2005/0141511 A1* | 6/2005 | Gopal | ................. H04W 76/046 370/395.2 |

(Continued)

OTHER PUBLICATIONS

International Search Report dated Mar. 2, 2015 for corresponding International Application No. PCT/FR2014/053304, filed Dec. 12, 2014.

(Continued)

*Primary Examiner* — Omar J Ghowrwal
(74) *Attorney, Agent, or Firm* — David D. Brush; Westman, Champlin & Koehler, P.A.

(57) ABSTRACT

A method for diagnosing service functions in an IP domain including a PDP node, which makes decisions relating to structuring of a service function chain relying on a set of service functions (SF), and notifies these decisions to other nodes of the IP domain, and at least one SF node associated with at least one SF function hosted by or accessible via the SF node. The method includes: a diagnosing node sending a request to an SF node (a diagnosed node) concerning a diagnosed SF function, which is identified in the request and/or is the only SF function associated with the diagnosed node; the diagnosed node forms at least one diagnostic operation concerning the diagnosed function; and the diagnosed node sends a response to the diagnosing node, the response including an indication of success or failure of the diagnostic operation or of non-operation or malfunction of the diagnosed function.

21 Claims, 2 Drawing Sheets

(52) U.S. Cl.
CPC .............. *H04L 43/12* (2013.01); *H04L 43/50* (2013.01); *H04L 45/50* (2013.01)

(56) References Cited

U.S. PATENT DOCUMENTS

2011/0314145 A1    12/2011   Raleigh et al.
2015/0055512 A1*    2/2015   Zhang ................. H04L 65/1006
                                                        370/259

OTHER PUBLICATIONS

Boucadair et al., "Service Function Chaining: Framework & Architecture; draft-boucadair-sfc-framework-OO.txt", Service Function Chaining: Framework & Architecture; Draft-Boucadair-SFC-Framework-OO.Txt, Internet Engineering Task Force, IETF; Standardworkingdraft, Internet Society (ISOC) 4, Rue Des Fa Lai Ses CH-1205 Geneva, Switzerland, Oct. 3, 2013 (Oct. 3, 2013), pp. 1-24, XP015092848.
Written Opinion dated Mar. 2, 2015 for corresponding International Application No. PCT/FR2014/053304, filed Dec. 12, 2014.
English Translation of the Written Opinion dated Mar. 2, 2015 for corresponding International Application No. PCT/FR2014/053304, filed Dec. 12, 2014.

\* cited by examiner

FIG. 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Length             |  Class-Num    |    C-Type     |
+-+-+-+-+-+-+-+-+-+-+-+-+-+-+-+-+-+-+-+-+-+-+-+-+-+-+-+-+-+-+-+-+
|                                                               |
|                    // (Object payload) //                     |
|                                                               |
+-+-+-+-+-+-+-+-+-+-+-+-+-+-+-+-+-+-+-+-+-+-+-+-+-+-+-+-+-+-+-+-+
```

FIG. 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Code      |          Checksum             |
+-+-+-+-+-+-+-+-+-+-+-+-+-+-+-+-+-+-+-+-+-+-+-+-+-+-+-+-+-+-+-+-+
|           Identifier          |        Sequence Number        |
+-+-+-+-+-+-+-+-+-+-+-+-+-+-+-+-+-+-+-+-+-+-+-+-+-+-+-+-+-+-+-+-+
|       Transmit Timestamp                                      |
+-+-+-+-+-+-+-+-+-+-+-+-+-+-+-+-+-+-+-+-+-+-+-+-+-+-+-+-+-+-+-+-+
|       Service Function Map Index Object                       |
+-+-+-+-+-+-+-+-+-+-+-+-+-+-+-+-+-+-+-+-+-+-+-+-+-+-+-+-+-+-+-+-+
|       Service Function List Object                            |
+-+-+-+-+-+-+-+-+-+-+-+-+-+-+-+-+-+-+-+-+-+-+-+-+-+-+-+-+-+-+-+-+
|       Service Function Identifier Object                      |
+-+-+-+-+-+-+-+-+-+-+-+-+-+-+-+-+-+-+-+-+-+-+-+-+-+-+-+-+-+-+-+-+
|       Tail Service Function Object                            |
+-+-+-+-+-+-+-+-+-+-+-+-+-+-+-+-+-+-+-+-+-+-+-+-+-+-+-+-+-+-+-+-+
|       Service Function Profile ID Object                      |
+-+-+-+-+-+-+-+-+-+-+-+-+-+-+-+-+-+-+-+-+-+-+-+-+-+-+-+-+-+-+-+-+
|       Recorded Service Function Map Object                    |
+-+-+-+-+-+-+-+-+-+-+-+-+-+-+-+-+-+-+-+-+-+-+-+-+-+-+-+-+-+-+-+-+
|       Test Packet Object                                      |
+-+-+-+-+-+-+-+-+-+-+-+-+-+-+-+-+-+-+-+-+-+-+-+-+-+-+-+-+-+-+-+-+
```

FIG. 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Code      |          Checksum             |
+-+-+-+-+-+-+-+-+-+-+-+-+-+-+-+-+-+-+-+-+-+-+-+-+-+-+-+-+-+-+-+-+
|           Identifier          |        Sequence Number        |
+-+-+-+-+-+-+-+-+-+-+-+-+-+-+-+-+-+-+-+-+-+-+-+-+-+-+-+-+-+-+-+-+
|       Transmit Timestamp                                      |
+-+-+-+-+-+-+-+-+-+-+-+-+-+-+-+-+-+-+-+-+-+-+-+-+-+-+-+-+-+-+-+-+
|       Service Function Map Index Object                       |
+-+-+-+-+-+-+-+-+-+-+-+-+-+-+-+-+-+-+-+-+-+-+-+-+-+-+-+-+-+-+-+-+
|       Service Function List Object                            |
+-+-+-+-+-+-+-+-+-+-+-+-+-+-+-+-+-+-+-+-+-+-+-+-+-+-+-+-+-+-+-+-+
|       Service Function Identifier Object                      |
+-+-+-+-+-+-+-+-+-+-+-+-+-+-+-+-+-+-+-+-+-+-+-+-+-+-+-+-+-+-+-+-+
|       Service Function Profile ID Object                      |
+-+-+-+-+-+-+-+-+-+-+-+-+-+-+-+-+-+-+-+-+-+-+-+-+-+-+-+-+-+-+-+-+
|       Recorded Service Function Map Object                    |
+-+-+-+-+-+-+-+-+-+-+-+-+-+-+-+-+-+-+-+-+-+-+-+-+-+-+-+-+-+-+-+-+
|       Test Result Packet Object                               |
+-+-+-+-+-+-+-+-+-+-+-+-+-+-+-+-+-+-+-+-+-+-+-+-+-+-+-+-+-+-+-+-+
|       Internet Header + Original Data Datagram                |
+-+-+-+-+-+-+-+-+-+-+-+-+-+-+-+-+-+-+-+-+-+-+-+-+-+-+-+-+-+-+-+-+
```

FIG. 3

TRANSMISSION AND RECEPTION OF A DIAGNOSTIC REQUEST IN AN IP NETWORK

CROSS-REFERENCE TO RELATED APPLICATIONS

This application is a Section 371 National Stage Application of International Application No. PCT/FR2014/053304, filed Dec. 12, 2014, the content of which is incorporated herein by reference in its entirety, and published as WO 2015/097359 on Jul. 2, 2015, not in English.

FIELD OF THE DISCLOSURE

The present invention relates to the field of telecommunications, and in particular communications networks that use the Internet protocol (IP). More particularly, the present invention relates to managing value-added IP networks, i.e. networks capable of processing traffic differently depending on the nature of the data traffic being handled in the network.

In the context of the present invention, the term "IP domain" is used to mean one or more IP networks placed under the responsibility of a single administrative entity. An "IP domain" may in particular be a network operated by an IP connectivity service provider.

BACKGROUND OF THE DISCLOSURE

These different kinds of traffic processing are implemented in an IP domain by means of devices known as "service functions", referred to below as "SF functions". By way of example, among the SF functions commonly in use there are to be found:

- quality of service functions, such as marking and classifying traffic, or conditioning or scheduling traffic;
- security functions, such as encrypting traffic, installing and activating filters defined by access control lists maintained by certain routers of the IP network, and IPv4 or IPv6 firewalls;
- network address translation (NAT) functions or NAT64 functions (i.e. mechanisms enabling IPv6 clients to communicate with IPv4 servers;
- probe functions, such as deep packet inspection (DPI) functions, e.g. for parental control purposes;
- functions for personalizing or optimizing Internet connections, such as "TCP optimizer";
- video content optimization functions (e.g. a cache function); or indeed
- functions for inserting information in hypertext transfer protocol (HTTP) headers, e.g. "X-forwarded-for" (X-FF) or "forwarded".

SF functions may be hosted by all kinds of equipment, e.g. a router, a server, or a switch. Furthermore, a single piece of equipment may host one or more SF functions.

In the context of the present invention, it is said that a node of an IP domain is "associated" with an SF function when the SF function is hosted by the node or is accessible via the node; in addition, a node associated with at least one SF function is referred to as an "SF node".

Installing a value-added service based on a policy of differentiated traffic handling (such as a traffic handling and routing policy, or quality of service, or indeed security such as encrypting transmitted data) generally requires a plurality of SF functions in combination (which may be hosted on one or more nodes of the network), possibly in an order that is characteristic of the traffic flow direction (e.g. from the Internet to a terminal or from a terminal to the Internet), in order to form functional chains. An ordered sequence of SF functions is referred to below as a service function chain (SFC). In other words, the chaining of service functions specifies a list of SF functions to be used for processing a data stream characteristic of said service, and the order in which the functions are to be used in sequence for processing the stream. It should be observed that the service function chains associated with each traffic direction (incoming traffic v. outgoing traffic) may be identical or different.

For example, transmission control protocol (TCP) traffic from clients having only an IPv6 protocol stack can involve chaining a TCP optimization function, an IPv6 firewall function, and a NAT64 function in order to enable such clients to access IPv4 content available on the Internet; and the processing of the TCP traffic for such IPv6 clients can involve changing an IPv4 firewall function and a NAT64 in order to enable those clients to receive said IPv4 content available on the Internet. Another example is that of a virtual private network (VPN) service on IP, which makes use of handling and routing functions combined with quality of service functions and security functions distributed in different elements making up the network supporting the VPN, or in elements that are connected to the support network, such as a firewall.

Explicit indication means (e.g. marking conveyed by each packet belonging to a given stream) can then be used to inform the piece of equipment hosting the individual SF functions about the chain of which they form a part in order to process the stream(s) associated with that chain. Each piece of equipment hosting at least one individual SF function making up an SFC then refers to this explicit indication in order to decide how each packet belonging to said stream is to be processed.

If no explicit indication means are used, then so-called "classification" functions may be activated to determine whether or not a given SF function is to be invoked. A node associated with at least one classification function is referred to as a "classifier"; a classifier is thus a device of the IP domain that acts as a function of the SFCs available within the IP domain to classify the different kinds of traffic and to invoke SF functions in the appropriate order.

Service function chaining techniques are recent. The state of the art shows that the first developments of this service function chaining technique rely on monolithic single-manufacturer approaches.

Thus, the article by M. Boucadair, C. Jacquenet, R. Parker, D. Lopez, J. Guichard, and C. Pignataro entitled "Differentiated service function chaining framework" (available at the address tools.ietf.org/html/draft-boucadair-sfc-framework-00), describes a procedure for creating a chain of service functions. Furthermore, it describes a generic service function chaining architecture together with the functional entities that are needed for installing such an architecture. Specifically, that article gives the responsibility of constructing SFCs to entities referred to as policy decision points (PDPs).

It should be recalled in this respect that the resource allocation protocol (RAP) working group of the Internet engineering task force (IETF) has defined, in a document RFC 2753, a functional architecture that is specific to managing networks implementing one or more different traffic handling policies. In particular, that architecture defines devices referred to as PDPs that are responsible for taking decisions about the structuring of a service relying on a set of SF functions, and for notifying these decisions to the network nodes that are involved in deploying and operating said service. In particular, the PDP is responsible for taking decisions representing various different traffic handling policies that need to be executed by one or more nodes of the network, and that lead to ad hoc functions being configured in the network nodes that are concerned. By way of example, PDP devices may be hosted in a server, a gateway, or a router.

In the context of the present invention, the term "PDP node" is used to designate a node hosting or giving access to a PDP device. It should be observed that a node of an IP network may optionally be associated both with a PDP device and with one or more SF functions.

According to the above-mentioned article by Boucadair et al., the PDP communicates with the SF nodes or with nodes hosting a stream classification function (or a combination of both), giving instructions about installing different traffic handling policies, which are characterized by the various SFCs used for processing all of the traffic streams handled in the network depending on their natures. The article states in particular that the PDP must have knowledge of the list of service functions that are active in the network together with their locations.

Once these SFCs have been structured by the PDP, the nodes of the network are informed about them. By way of example, this may be done in the form of a map describing SF functions that are to be executed in a certain order for a certain type of data traffic associated with said map. Receiving this map makes it possible in particular for a node of the network to determine its position in the SFC and, in compliance with the instructions of the SFC, make use of the SF functions that are associated therewith, and then to determine which is the following SF node to which the traffic is to be transferred.

In the context of installing and using complex network services (i.e. relying on different individual service functions being used in order), the person skilled in the art will readily understand that a procedure for diagnosing SF functions and SFCs is an addition that is both natural and necessary for the technique of chaining SF functions. For example, a diagnostic procedure is required in particular in value-added service environments such as:

telemedicine services for which the ability to guarantee the handling of traffic characteristic of modifying biometric data (e.g. in real time) relies on intelligent chaining of traffic engineering functions (calculating and setting up routes having characteristics in terms of performance and robustness that are compatible with the nature of said traffic), of quality of service (e.g. traffic prioritizing functions), and of security (e.g. encrypting data before transmitting it over the network); the very nature of this type of service requires diagnostic procedures that are appropriate both in terms of automating the diagnostic process and in terms of the performance of such processes; or virtual private network (VPN) services, that need to be engineered and operated in compliance with the contract negotiated with the client of said service; a VPN service relies on a combination of service functions that can often be complex (e.g. functions of handling and routing traffic within the VPN, classification functions, marking and conditioning the traffic handled within the VPN, security functions such as activating access filters and firewalls for protecting access to sites connected via the VPN), and that require diagnostic tools that are reliable and of high performance; the process of diagnosing service functions used in a VPN contributes to guaranteeing to the client that the service provided is in compliance with the negotiations between the client and the network operator.

In order to determine whether an IP machine is reachable in the IP routing sense, mechanisms are known such as those provided by the Internet control message protocol (ICMP). Nevertheless, the fact that an SF function is accessible at IP level does not mean that it is operational. Furthermore, for any given SFC, ICMP messages are conveyed along IP routes that are set up in the network in conventional manner, and not along routes that are followed by traffic associated with an SFC, which may be different from conventional IP routes.

By way of example, a DS-Lite function known as address family transition router (AFTR), as defined in IETF document RFC 6333 which acts like a router facilitating the transition from IPv4 Internet to IPv6 Internet, and embeds in particular NAT type and encapsulation type SF functions, might not be operational even though it responds to ICMP messages: the AFTR function is operational if, and only if, the IPv4-in-IPv6 encapsulation/decapsulation and NAT components are both operational.

The ICMP protocol suffers from several drawbacks. In particular:

it does not detect the non-availability, if any, of an SF function that is indeed reachable;

it does not provide a diagnosis of an SF function, an SFC, or a subset of SF functions within an SFC (where such a subset is referred to in the context of the present invention as an "SF function sequence";

it does not provide a diagnosis of traffic classification rules (where the term "classification rules" is used to designate rules used to handle traffic in the network as a function of the SFC with which given traffic is associated);

it does not make it possible to calculate the delay or the jitter associated with handling the traffic associated with an SFC within the network;

it does not make it possible to verify that the list of SF functions does indeed correspond to what was configured by the administrative entity in charge of operating the network; and it does not make it possible to select an operational SF function from a plurality of SF functions of the same kind, such that the SFC can be built up from a set of SF functions that are considered to be operational as a result of the diagnostic procedure.

SUMMARY

In a first aspect, the present invention thus provides various methods of diagnosing service functions in an IP network.

Thus, the invention firstly provides a diagnostic method for diagnosing service functions in an IP domain comprising at least one node, referred to as a PDP node, that is responsible for taking decisions relating to the structuring of a service function chain relying on a set of service functions, referred to as SF functions, and for notifying these decisions to other nodes of said IP domain, and at least one node, referred to as an SF node, associated with at least one SF function hosted by said SF node or accessible via said SF node. Said method is remarkable in that it comprises the following steps:

a node, referred to as a diagnosing node, sends a request to an SF node, referred to as a diagnosed node, concerning an SF function, referred to as a diagnosed function, which function is identified in the request and/or is the only SF function associated with said diagnosed node;

the diagnosed node forms at least one diagnostic operation concerning said diagnosed function; and the diagnosed node sends a response to said diagnosing node, said response including at least an indication of the success or failure of the diagnostic operation or of the non-operation or malfunction of the diagnosed function.

Secondly, the invention also provides a diagnostic method for diagnosing service functions in an IP domain comprising at least one node, referred to as a PDP node, that is responsible for taking decisions relating to the structuring of a service function chain relying on a set of service functions, referred to as SF functions, and for notifying these decisions to other nodes of said IP domain, and at least one node, referred to as an SF node, associated with at least one SF function hosted by said SF node or accessible via said SF node. Said method is remarkable in that it comprises a step during which a network node, referred to as a diagnosing node, sends a diagnostic request comprising at least one identifier, referred to as a list identifier, identifying an ordered list of identifiers of SF functions or of IP addresses of SF nodes, and in that it further comprises the following iterative steps:

a node, referred to as a diagnosed node, associated with an SF function, referred to as a diagnosed function, forming part of said ordered list, receives a request comprising at least said list identifier;

the diagnosed node forms at least one diagnostic operation concerning said diagnosed function; and if said diagnostic operation is performed successfully, the diagnosed node sends a request comprising at least said list identifier to an SF node associated with the following SF function in said ordered list to the diagnosed function, and in that:

if a diagnostic operation fails, or reveals that the diagnosed SF function is not operational, the diagnosed node sends a response including at least an indication of failure of the diagnostic operation, or of non-operation or malfunction of the diagnosed function; or if in contrast all of the diagnostic operations are performed successfully, the diagnosed node associated with the last SF function of the ordered list sends a response including at least a successful diagnosis result.

Thirdly, the invention also provides a diagnostic method for diagnosing service functions in an IP domain comprising at least one node, referred to as a PDP node, that is responsible for taking decisions relating to the structuring of a service function chain relying on a set of service functions, referred to as SF functions, and for notifying these decisions to other nodes of said IP domain, and at least one node, referred to as an SF node, associated with at least one SF function hosted by said SF node or accessible via said SF node. Said method is remarkable in that it comprises a step during which a network node, referred to as a diagnosing node, sends a diagnostic request comprising at least one identifier of an SF function chain, referred to as a SFC, and optionally together with an identifier, referred to as an end-of-sequence identifier, identifying an SF function terminating a sequence included in said SFC, and in that it further comprises the following iterative steps:

a node, referred to as a diagnosed node, associated with an SF function, referred to as a diagnosed function, forming part of said SFC or said sequence, where appropriate, receives a request comprising at least said identifier of the SFC, and said end-of-sequence identifier, where appropriate;

the diagnosed node forms at least one diagnostic operation concerning said diagnosed function; and if said diagnostic operation is performed successfully, the diagnosed node sends a request comprising at least the identifier of the SFC, and the end-of-sequence identifier, where appropriate to an SF node associated with the following SF function in the SFC to the diagnosed function, and in that:

if a diagnostic operation fails, or reveals that the diagnosed SF function is not operational, the diagnosed node sends a response including at least an indication of failure of the diagnostic operation, or of non-operation or malfunction of the diagnosed function; or if in contrast all of the diagnostic operations are performed successfully, the diagnosed node associated with the last SF function of the SFC or, where appropriate, with the SF function identified by the end-of-sequence identifier, sends a response including at least a successful diagnosis result.

By means of these provisions:

it is possible to qualify proper operation of SF functions involved in handling various kinds of traffic in the network, to detect non-availability of one or more SF functions, and to improve the time required for establishing a diagnosis, and thus the time required for reestablishing service in the event of failure being observed when executing one or more SF functions making up the same chain or different chains;

it is possible to qualify the execution performance of all or part of the SF functions making up an SFC, and thus contribute to qualifying a quality level associated with processing a given kind of traffic by the SFC; and assistance is available for decision taking in various contexts, e.g. in order to select instances of the same SF function situated at different locations (and identified by a plurality of distinct IP addresses, for example) for the purposes of optimizing traffic load sharing, or of matching an SFC to the nature or the constraints of the traffic that is to be processed by that SFC; the decision may be of various types, for example selecting SF functions to replace faulty SF functions within a given chain, or setting up new routes for optimizing traffic load sharing by using SF functions of the same kind and available at different locations in the network.

It should be observed that a PDP may need to correlate network alarms with the results of diagnostic methods as summarized briefly above. In particular, in order to determine whether an SF function cannot be reached because of a network failure (i.e. a connectivity problem), as opposed to because of the SF function itself, the PDP needs to perform an appropriate network diagnostic procedure; for example, the PDP may use a conventional "trace-route" procedure in order to pass along the route between two SF functions; the PDP can also request a remote SF function to execute the trace-route procedure and report the results to the PDP (these methods of correlation between the network layer and the service layer are naturally given purely by way of example).

It should also be observed that the invention is advantageously compatible with all types of (fixed or mobile) IP networks, and with the great majority of known routing protocols. It may be implemented at IP level or at multi-protocol label switching (MPLS) level. In addition, it encourages extensions to protocols such as ICMP or constrained access protocol (CoAP), which extensions serve to enrich the functional capabilities of those protocols.

It should be observed that said diagnosing node may equally well be a PDP node or an SF node.

In a second aspect, the invention provides various devices.

Firstly, it thus provides a node referred to as a diagnosing node, in an IP domain comprising at least one node, referred to as a PDP node, that is responsible for taking decisions relating to the structuring of a service function chain relying on a set of service functions, referred to as SF functions, and for notifying these decisions to other nodes of said IP domain, and at least one node, referred to as an SF node, associated with at least one SF function hosted by said SF node or accessible via said SF node. Said diagnosing node is remarkable in that it possesses means for:

sending a diagnostic request to an SF node, referred to as a first diagnosed node, associated with an SF function, referred to as a first diagnosed function; and     receiving a response from an SF node, referred to as a last diagnosed node, associated with an SF function, referred to as a last diagnosed function, said response including at least an indication of the success or failure of the diagnostic operation or of the non-operation or malfunction of said last diagnosed function.

According to particular characteristics:

said first and last diagnosed nodes are identical;

said first and last diagnosed functions are identical; and the diagnosed SF function is identified in the request and/or is the only SF function associated with the diagnosed node.

According to other particular characteristics:

said diagnostic request includes at least one identifier, referred to as a list identifier, identifying an ordered list of SF function identifiers or of IP address of SF nodes; and said first and last diagnosed functions form part of said ordered list.

According to further particular characteristics:

said diagnostic request includes at least one identifier of a chain of SF functions, referred to as SFC, optionally together with an identifier referred to as an end-of-sequence identifier that identifies an SF function terminating a sequence included in said SFC; and said first and last diagnosed functions form part of said SFC, and where appropriate of said sequence.

Secondly, the invention also provides a node referred to as a diagnosed node, in an IP domain comprising at least one node, referred to as a PDP node, that is responsible for taking decisions relating to the structuring of a service function chain relying on a set of service functions, referred to as SF functions, and for notifying these decisions to other nodes of said IP domain, and at least one node, referred to as an SF node, associated with at least one SF function hosted by said SF node or accessible via said SF node. Said diagnosed node is an SF node remarkable in that it possesses means for:

receiving from a node of the IP domain a diagnostic request concerning an SF function, referred to as a diagnosed function, associated with said diagnosed node; and     performing at least one diagnostic operation concerning said diagnosed function.

According to particular characteristics, said diagnosed node further possesses means for sending a response comprising at least an indication of success or failure of the diagnostic operation, or of non-operation or malfunction of said diagnosed SF function.

According to other particular characteristics, said diagnosed node also possesses means for transmitting said diagnostic request to another SF node associated with an SF function specified in the diagnostic request.

In a third aspect, the invention provides a system for diagnosing service functions in an IP domain. Said system is remarkable in that it comprises at least one diagnosing node and at least one diagnosed node as described briefly above.

The advantages made available by these devices and this system are essentially the same as those made available by the service function diagnostic methods briefly described above.

It should be observed that it is possible to implement these devices in the context of software instructions and/or in the context of electronic circuits.

The invention also provides a computer program downloadable from a communications network and/or stored on a computer-readable medium and/or executable by a microprocessor. The computer program is remarkable in that it comprises instructions for executing steps of any one of the service function diagnostic methods summarized briefly above, when executed on a computer.

The advantages made available by the computer program are essentially the same as those made available by said methods.

BRIEF DESCRIPTION OF THE DRAWINGS

Other aspects and advantages of the invention appear on reading the following detailed description of particular implementations given as non-limiting examples. The description refers to the accompanying figures, in which.

DETAILED DESCRIPTION OF ILLUSTRATIVE EMBODIMENTS

Consideration is given to an IP network comprising firstly at least one PDP node and secondly nodes $N_i$ where $i \geq 1$.

Figure 1:
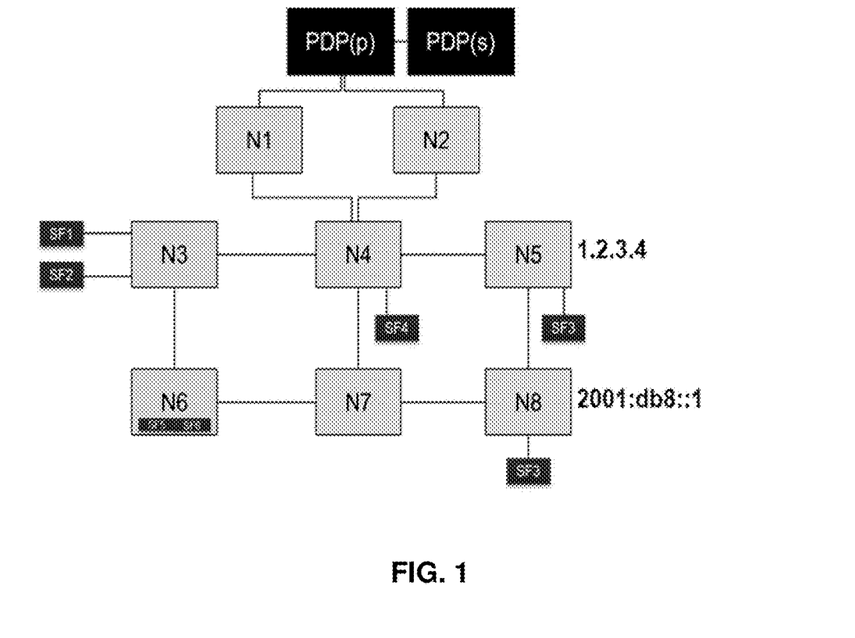
FIG. 1 is a diagram of an example network suitable for implementing the invention.

By way of example, FIG. 1 is a diagram of an IP network comprising a "primary" PDP node, marked PDP(p) in the figure and a "secondary" PDP node, marked PDP(s) in the figure. Specifically, it is generally recommended in IP networks to make provision for at least one secondary PDP in addition to the primary PDP in order to improve the robustness and the availability of the PDP device in the event of a failure, and in order to enable load to be shared. Nevertheless, the present invention could naturally be implemented in a configuration in which only one PDP is active.

The network of FIG. 1 also has eight nodes that do not have an embedded PDP function, which nodes are marked N1 to N8. The node N6 hosts a function SF5 and a function SF6. The node N3 is connected to a respective IP domain hosting a function SF1 and a function SF2. The node N4 is connected to a respective IP domain hosting a function SF4. The nodes N5 and N8 are each connected to a respective IP domain hosting a function SF3. Finally, the nodes N1, N2, and N7 are not associated with any SF function.

The (primary or secondary) PDP node associates each SF function with an identifier referred to as a "Service_Function_Identifier". This identifier designates an atomic function (e.g. NAT or firewall) in unambiguous manner. The identifier of the SF function is structured as a string of characters. Other schemes for identifying SFs may be adopted within a single IP domain. The identifier is generally allocated by the administrative entity that manages the IP domain.

As shown in FIG. 1, a given SF function (specifically the function SF3) may be hosted by a plurality of SF nodes: consequently, a plurality of IP addresses may be associated with the same identifier of an SF function, for the purposes of locating different instances of the SF function in the network. It should be observed that these IP addresses may be of the same family (i.e. IPv4, IPv6, or some other family), or they may be of different families.

Each of these IP addresses represents the value of an attribute referred to as a "Service_Function_Service_Locator". Thus, each SF function possesses an identifier (Service_Function_Identifier) that is globally unique at the scale of the IP domain, but a given SF function may have a plurality of Service_Function_Locator attributes, depending on the number of instances of the SF function in the IP domain, and on their locations. For example, in the network of FIG. 1, the function SF3 may be reachable with:

Service_Function_Service_Locator==1.2.3.4 (IPv4 address of the node N5); and

Service_Function_Service_Locator==2001:db8::1 (IPv6 address of the node N8).

The PDP maintains a list of the Service_Function_Service_Locator attributes for each SF function identified by its own identifier Service_Function_Identifier.

It is also possible to define at least one profile for a given SF function. By definition, a profile is associated with a policy (e.g. a routing, security, or quality of service policy) that makes use in particular of this SF function. For example, for a firewall function, a first profile may be a parental control filter for children; a second profile may be a parental control filter for adults.

In addition to the list of identifiers, attributes, and SF function profiles, the PDP maintains a list of SFCs that are instantiated in the IP domain. There follows an example of a list of SFCs:

Chain_1=SF1, SF3, SF5;
Chain_2=SF2, SF1, SF6;
Chain_3=SF3, SF4, SF6, SF5;
Chain_4=SF2, SF6 (Profile_1), SF4;
Chain_5=SF1, SF6 (Profile_2, Profile_3), SF5.

The invention makes it possible to launch diagnostic operations that, in practice, can be implemented using any known method. By way of example, it is possible to produce a test packet in order to diagnose an SF function; by way of example, such a test packet may be a real time transfer protocol (RTP) message to verify whether an SF function is compatible with a given codec (coder/decoder), or an IPv4 packet encapsulated in an IPv6 packet in order to verify whether a DS-Lite function behaves in compliance with the instructions it has received about processing the packets it receives. Another diagnostic method consists in using the resources of a preconfigured module associated with an SF node; this module may be "hard" configured in the device (in which case it is called a "watchdog"), or it may be configured by means of a command issued by an administrator of the IP domain.

In order to request diagnostic operations, the invention makes use of a first type of diagnostic message referred to as "DIAG_REQ( )". This primitive may have as argument one or more of the following attributes:

Service_Function_Map_Index: this attribute provides the identifier of the SFC; a value "0" for this attribute means that the destination node of the DIAG_REQ( ) message is to perform a diagnostic operation for all of the SFCs to which a given SF function belongs; this attribute is optional;

Service_Function_Identifier: this attribute specifies the identifier of said given SF function; this attribute is optional, since it is not absolutely necessary to provide this attribute in an SF node associated with this given SF function and with no other SF function;

Service_Function_Profile_ID: this attribute specifies the identifier of a configuration profile for an SF function; this attribute is optional; a diagnostic message may contain a plurality of profile identifiers;

Tail_SF: this attribute is optional; if present, it specifies within a sequence of SF functions within a single SFC, the last SF function concerned by a diagnostic operation;

Request_Identifier: this attribute is required in order to correlate a request with the response to the request;

Request_Sequence_Number: this attribute is used to distinguish between different diagnostic messages in the event of retransmission;

Timestamp: this attribute is used to include a time stamp for the sending of the request;

ORIGINAL_DIAG_REQ( ) when diagnosing an SFC or a sequence of SF functions, the original DIAG_REQ( ) message is preferably encapsulated in another DIAG_REQ( ) diagnosis request that is sent to a node associated with the next SF function in the chain or the sequence;

Test_Packet: this attribute is optional; as mentioned above, a test packet may be included in order to diagnose an SF function; it is also possible to a test packet for other diagnostic operations, or for example in order to verify classification rules, or indeed to correlate classification rules with traffic transfer decisions; and Recorded_Service_Function_Map: this attribute is optional; it specifies the ordered list of identifiers of SF function through which a diagnostic message has passed.

For the reports giving the results of diagnostic operations, the invention makes use of a second type of diagnostic message, referred to as "DIAG_RES( )". This primitive may have as its arguments one or more of the following attributes:

the same attributes as a DIAG_RES( ) request, with the exception of the Tail_SF attribute, which is absent from DIAG_REG( ) messages;

STATUS: this attribute specifies explicitly the result of the diagnostic operation; two codes are defined for this attribute:

"SUCCESS": indicates that the diagnostic operation has been performed successfully;

"FAIL": this code is used to indicate that the diagnostic operation has failed;

Error_Code: this attribute gives the reason for a failure of the diagnostic operation; these error codes may in particular be the following:

"INACTIVE": this message indicates that the SF function is in principle associated with the node that issued the DIAG_RES( ) message, but that it has been deactivated;

"BEING CONFIGURED": this message indicates that the SF function is being configured;

"NOT_FOUND": this code indicates that the SF function is not associated with the node that send the DIAG_RES( ) message;

"NO_RESOURCES": this code indicates that the SF node associated with said SF function does not have sufficient resources (e.g. in the event of a congested link, or a critical CPU threshold);

"PROHIBITED": this code indicates that the diagnostic request is not authorized;

"RETRY AFTER": this code indicates that a new diagnostic request must be sent after a certain period has expired; by way of example, this error code may be sent by an SF node that is in overload conditions;

"BAD_INDEX": this code indicates that the SFC specified by a diagnostic message is unknown;

Test_Packet_Result: if a test packet was included in a request, then the test packet is presented as input to the local SF function; the result of the processing at the output from the SF function is recorded in this Test_Packet_Result attribute.

When an SF function detects a failure or a problem as a result of a diagnostic operation, it sends a notification message to the PDP in order to inform it about the failure. This notification makes it possible to reduce the length of time the service is unavailable. The notification consists in sending a DIAG_RES( ) message to the PDP in spontaneous manner: in other words, a DIAG_RES( ) message is sent by the SF function even though it has not received a DIAG_REQ( ) message from the PDP.

Various quality of service classes, referred to as service classes may be configured in an IP domain. Each service class is identified by a differentiated service code point (DSCP) mark, or by using the "traffic class" bits of an MPLS packet, if MPLS switching is used, or another identifier characteristic of the characteristic messages of the network protocol being used.

The traffic transfer path between two SF functions, or between the PDP and an SF function, may differ from one service class to another. As a result, the diagnosis of a "Chain_1" SFC on the basis of a service class CS1 does not make it possible in any way to deduce that the "Chain_1" SFC is functional for all of the active service classes. The DIAG_REQ( ) diagnostic message should thus preferably indicate the service class in question; an implementation involves DSCP marking of the DIAG_REQ( ) message.

Also preferably, the diagnosis of an SF function, an SFC, or of a sequence of SF functions within an SFC needs to be performed for all of the service classes that are configured in an IP domain.

There follows a description of two implementations of the method of the invention.

In a first implementation, referred to as "centralized mode", it is a PDP that performs the diagnostic operations for all or some of the SF functions that are active in the IP domain. The PDP can in particular verify whether:

a given SF function is operational, i.e. whether it is not only reachable (i.e. accessible at an IP address), but also whether it is executing the expected service correctly;

a profile associated with a given SF function is operational;

some or all of the SFCs are operational;

a sequence of SF functions within an SFC is operational;

the classification rules are functional and mutually consistent; and the list of SF functions invoked for a given SFC corresponds to the list that was configured by the administrative entity in charge of operating the IP domain.

The PDP can perform various diagnostic operations, and there follow some characteristic examples.

1) In order to verify whether a given SF function is operational, the PDP sends a DIAG_REQ( ) message having the following attributes:

Service_Function_Identifier: this attribute should specify the identifier of the SF function; as explained above, this attribute is necessary in the event of a plurality of SF functions being co-located within a piece of equipment that is reachable at the same IP address;

Request_Identifier: this attribute is required in order to correlate a request with the response to the request;

Request_Sequence_Number: this attribute is used to distinguish diagnostic messages in the event of retransmission;

Timestamp: this attribute is used to include a time stamp for the sending of the request; and Test_Packet: an optional test packet for including when the PDP seeks to perform certain verifications.

By way of example for the network of FIG. 1, DIAG_REQ(SF1) designates a message sent by the PDP to diagnose the function SF1.

2) In order to verify whether the classification rules correspond to the targets of the administrative entity in charge of the network, the PDP sends a DIAG_REQ( ) message having the following attributes:

Service_Function_Map_Index: this attribute is set to "0";

Service_Function_Identifier: if present, this attribute gives the identifier of the classification function;

Request_Identifier: this attribute is required for the purpose of correlating a request with the response to the request;

Request_Sequence_Number: this attribute is used to distinguish diagnostic messages in the event of retransmission;

Timestamp: this attribute is a copy of the "Timestamp" attribute of the request; the PDP can calculate the round trip time (RTT) by subtracting the value of Timestamp from the value corresponding to the time stamp on receiving the DIAG_RES( ) message;

Recorded_Service_Function_Map: this attribute contains an empty list; and

Test_Packet: a test packet used for recovering the result of the classification applied to the packet; specifically, the classifier applies the classification rules to the packet and returns the results of classification in a DIAG_RES( ) response.

3) In order to verify whether all of the SFCs to which a given SF function belongs are operational, the PDP sends a DIAG_REQ( ) message having the following attributes:

Service_Function_Map_Index: this attribute has the value "0" when the PDP seeks to diagnose all of the SFCs;

Service_Function_Identifier: this attribute gives the identifier of the SF function; this attribute is necessary when a plurality of SF functions are co-located within equipment that is reachable at the same IP address; if this attribute is not specified in a request sent to an SF node associated with a single SF function, then said SF node assumes that the request is for that node; the mode by default is to include this attribute;

Request_Identifier: this attribute is required in order to correlate a request with the response to the request;

Request_Service_Number: this attribute is used to distinguish between diagnostic messages in the event of retransmission;

Timestamp: this attribute is the copy of the Timestamp attribute of the request; the PDP can calculate the RTT by subtracting this Timestamp value from the value corresponding to the time stamp on reception of the DIAG_RES( ) message; and Recorded_Service_Function_Map: this attribute is optional; the first diagnostic request contains an empty list.

By way of example for the network shown in FIG. 1, DIAG_REQ(Service_Function_Map_Index=0, SF6) is a message sent by the PDP to diagnose all of the SFCs including the function SF6.

4) In order to verify whether a profile associated with a given SF function is operational, the PDP sends a DIAG_REQ( ) message having the following attributes:

Service_Function_Identifier: this attribute gives the identifier of the SF function; this attribute is necessary in the event of a plurality of service functions being co-located within equipment that is reachable at the same IP address;

Service_Function_Profile_ID: this attribute gives the identifier of the profile in question;

Request_Identifier: this attribute is required in order to correlate a request with the response to the request;

Request_Sequence_Number: this attribute is used to distinguish between diagnostic messages in the event of retransmission; and Timestamp: this attribute is the copy of the Timestamp attribute of the request; the PDP can calculate the RTT by subtracting this Timestamp value from that corresponding to the time stamp on reception of the DIAG_RES( ) message.

By way of example for the network of FIG. 1, DIAG_REQ(SF6, Profile_1) is a message sent by the PDP in order to diagnose the profile Profile_1 of the function SF6.

5) In order to verify whether a sequence within an SFC is operational, the PDP sends a DIAG_REQ( ) message having the following attributes:

Service_Function_Map_Index: this attribute gives the identifier of the SFC in question; as mentioned above, the value "0" means that the PDP seeks to diagnose all of the SFCs to which a given SF function belongs;

Service_Function_Identifier: this attribute gives the identifier of the first SF function of the sequence;

Tail_SF: this attribute is optional; if present, it specifies, within a sequence, the last SF function concerned by the diagnostic operation; if this attribute is not given, then all of the SF functions in the SFC chain following the SF function identified by Service_Function_Identifier are to be diagnosed;

Request_Identifier: this attribute is required in order to correlate a request with the response to the request;

Request_Sequence_Number: this attribute is used to distinguish between diagnostic messages in the event of retransmission;

Timestamp: this attribute is the copy of the Timestamp attribute of the request; the PDP calculates the RTT by subtracting this Timestamp value from the value corresponding to the time stamp on reception of the DIAG_RES( ) message; and Recorded_Service_Function_Map: this attribute is optional; the first diagnostic request contains an empty list.

By way of example, for the network of FIG. 1, DIAG_REQ(Service_Function_Map_Index=Chain_2, SF1) is a message sent by the PDP to diagnose the Chain_2 SFC (described above), beginning with the function SF1.

6) To verify whether an SFC is optional, the PDP sends a DIAG_REQ( ) message having the following attributes:

Service_Function_Map_Index: this attribute gives the identifier of the SFC in question; as mentioned above, the value "0" means that the PDP seeks to diagnose all of the SFCs to which a given SF function belongs;

Service_Function_Identifier: if present, this attribute gives the identifier of the first SF function involved in the SFC in question; it should be observed that this attribute is not essential since this information is redundant with the presence of the Service_Function_Map_Index attribute; nevertheless, the presence of this attribute makes it possible to optimize the processing performed by an SF node hosting a plurality of SF functions;

Request_Identifier: this attribute is required in order to correlate a request with the response to the request;

Request_Sequence_Number: this attribute is used for distinguishing between diagnostic messages in the event of retransmission;

Timestamp: this attribute is the copy of the Timestamp attribute of the request; the PDP can calculate the RTT by subtracting this Timestamp value from the value corresponding to the time stamp on reception of the DIAG_RES( ) message; and Recorded_Service_Function_Map: this attribute is optional; the first diagnostic request contains an empty list.

By way of example, for the network of FIG. 1, DIAG_REQ(Service_Function_Map_Index=Chain_1, SF1) is a message sent by the PDP to diagnose the Chain_1 SFC (described above).

7) In order to verify whether all of the SFCs are operational, the PDP sends as many messages as there are SFCs.

For example, in the FIG. 1 network, the following messages:

DIAG_REQ(Service_Function_Map_Index=Chain_1, [SF1]);

DIAG_REQ(Service_Function_Map_Index=Chain_2, [SF2]); and

DIAG_REQ(Service_Function_Map_Index=Chain_3, [SF3]) are sent to nodes associated respectively with the functions SF1, SF2, and SF3. The notation "[ . . . ]" means that the attribute is optional.

The DIAG_REQ( ) message is sent including as its destination address the IP address (Service_Function_Service_Locator) of the node associated with the SF function, and as its source address the IP address of the PDP (PDP_Locator).

If a plurality of Service_Function_Service_Locator IP addresses are known for the same SF function, the PDP may send a plurality of DIAG_REQ( ) messages. The PDP can send DIAG_REQ( ) messages to all of the known Service_Function_Service_Locator addresses associated with an SF function, or to only some of these addresses.

By way of example, for the network of FIG. 1, the PDP can send two DIAG_REQ( ) messages respectively to the IPv4 and IPv6 addresses of the function SF3.

The PDP can contact all of the Service_Function_Service_Locator addresses either sequentially or in parallel.

The PDP makes use of a retransmission period (or "retransmission timer") for minimizing any risks of losing diagnostic requests. If the PDP does not receive a response after the retransmission period has expired, the PDP resends another DIAG_REQ( ) message having attributes that are identical to those of the first DIAG_REQ( ) message, with the exception of the Request_Sequence_Number attribute, which gives a different value. For successive retransmissions, the PDP can use the same retransmission period or some other period, e.g. a retransmission period that lengthens in exponential manner on each retransmission.

If the destination address of the DIAG_REQ( ) message is not reachable, the PDP receives an error message. Receiving this error message indicates that the SF function in question is not reachable at the address identified by Service_Function_Service_Locator. The PDP can then take appropriate decisions, such as updating the SFCs so as to remove the Service_Function_Service_Locator in question from its policy tables and so as to switch traffic over to other locations (i.e. other Service_Function_Service_Locator addresses) in order to invoke the same SF function.

If the SF function identified by Service_Function_Identifier is not associated with the destination node of the message, the PDP receives an error message. The PDP then needs to verify the list of Service_Function_Service_Locator addresses for this SF function. The PDP may also take appropriate decisions, such as updating the SFCs so as to remove the Service_Function_Service_Locator addresses from its policy tables and so as to cause traffic to switch over to other locations (i.e. other Service_Function_Service_Locator addresses) in order to invoke the same SF function.

If the SF function identified by Service_Function_Identifier is associated with the destination node of the message, but the diagnostic operation fails (e.g. because of insufficient resources within the destination node), the PDP receives an error message. The PDP can then take appropriate decisions, such as updating the SFCs in order to remove the Service_Function_Service_Locator addresses from its policy tables and so as to switch traffic over to other locations (i.e. to other Service_Function_Service_Locator addresses) in order to invoke the same SF function.

If the function identified by Service_Function_Identifier does not form part of the SFC identified by the Service_Function_Map_Index attribute, then the PDP receives an error message comprising a "BAD_INDEX" error code. The PDP can then correct the value of the Service_Function_Map_Index attribute and send a new DIAG_REQ( ) message.

There follows a description of the operations performed by a network node, referred to as a "diagnosed node", on that diagnosed node receiving a DIAG_REQ( ) message, as described above.

1) If the message is destined for a classifier, it recovers the test packet and applies the classification rules to the packet.

If no error is signaled during the classification operation, the classifier sends a DIAG_RES( ) message having the following attributes:

Service_Function_Map_Index: this attribute gives the marking value that results from the classification (i.e. the SFC to be invoked for this packet);
Service_Function_Identifier: this attribute gives the identifier of the classification function;
Request_Identifier: this field is copied from the initial request;
Request_Sequence_Number: this field is copied from the initial request;
Timestamp: this field is copied from the initial request;
Recorded_Service_Function_Map: this attribute contains the identifier of the classifier;
Test_Packet: this field is copied from the initial request; this attribute makes it possible to correlate a request with the response to the request; this attribute is optional in the event that the PDP maintains a list for each request it has sent; and
Test_Packet_Result: the classifier applies the classification rules to the packet and returns the classification result in this field.

In the event of an error, the classifier sends a DIAG_RES( ) message characterized as follows:
the attributes of the DIAG_REQ( ) request are copied, as well as the Service_Function_Identifier and Recorded_Service_Function_Map attributes, which must include the identifier of the classifier;
STATUS attribute: the value "FAIL" indicates that the diagnostic operation has failed; and
Error_Code attribute: the classifier uses the error code corresponding to the error that was encountered when processing the test packet.

If the SF function identified by the Service_Function_Identifier attribute is not associated with the diagnosed node (reachable at the address Service_Function_Service_Locator), the classifier sends a DIAG_RES( ) message to the source address of the DIAG_REQ( ) message. This DIAG_RES( ) message is characterized as follows:
the attributes of the DIAG_REQ( ) request are copied, as well as the Service_Function_Identifier and Recorded_Service_Function_Map attributes, which must include the identifier of the classifier;
STATUS attribute: the value "FAIL" means that the diagnostic operation has failed; and
Error_Code attribute: the error code (not found) is used to indicate to the node that sends the DIAG_REQ( ) message that the SF function identified by Service_Function_Identifier is not associated with the diagnosed node.

2) If the SF function identified by Service_Function_Identifier is indeed associated with said diagnosed node, the diagnosed node performs the following steps:

If the Service_Function_Map_Index attribute is not being used:
if the Service_Function_Profile_ID attribute is not being used, that indicates that the diagnosed node is to perform at least one diagnostic operation concerning the SF function identified by the Service_Function_Identifier attribute;
if the Service_Function_Profile_ID attribute is used, that indicates that the diagnosed node is to perform at least one diagnostic operation concerning the SF function identified by the Service_Function_Identifier attribute, but only for the profile specified in the request;
if the diagnostic operations are performed successfully, the node then sends a DIAG_RES( ) message to the diagnosing node. This message is characterized as follows:
the attributes of the DIAG_REQ( ) request are copied, as well as the Service_Function_Identifier and Recorded_Service_Function_Map attributes, which must include the identifier of the SF function;
STATUS attribute: the value "SUCCESS" indicates that the diagnostic operation was successful.
In the event of one or more errors being observed during the operation of diagnosing the SF function identified by the Service_Function_Identifier attribute, the diagnosed node sends a DIAG_RES( ) message to the diagnosing node. This message is characterized as follows:

the attributes of the DIAG_REQ( ) request are copied, as well as the Service_Function_Identifier and Recorded_Service_Function_Map attributes, which must include the identifier of the SF function;

STATUS attribute: the value "FAIL" indicates that the diagnostic operation has failed; and Error_Code attribute: gives the error code (e.g. NO_RESOURCES if all of the resources of the diagnosed node are already in use).

If the Service_Function_Map_Index is used:

if the Service_Function_Map_Index is given a value other than "0", the diagnosed node verifies whether the function identified by the Service_Function_Identifier attribute forms part of the SFC identified by the Service_Function_Map_Index attribute.

If the SF function identified by the Service_Function_Identifier attribute is indeed part of the SFC identified by the Service_Function_Map_Index attribute, the diagnosed node performs the diagnostic operations for this SF function. If the diagnostic operations are successful, the diagnosed node verifies whether it is the last element of the SFC identified by the Service_Function_Map_Index attribute, and whether its Service_Function_Identifier identifier is given in the Tail_SF attribute (when this attribute is used in the DIAG_REQ( ) request).

If this is not so, the diagnosed node sends a DIAG_REQ( ) message to a node associated with the next SF function of the sequence or of the SFC, in compliance with the Service_Function_Map_Index attribute. The source address of this new message is the IP address of the node associated with the SF function identified by the Service_Function_Identifier attribute. The destination address of this new message is the IP address of the node associated with the next SF function as identified in the list corresponding to the Service_Function_Map_Index attribute. If a plurality of Service_Function_Service_Locator addresses are known and suitable for use in reaching the node associated with the next SF function of the list identified by the Service_Function_Map_Index attribute, the diagnosed node sends a plurality of DIAG_REQ( ) messages. These DIAG_REQ( ) messages can be sent to all of the Service_Function_Service_Locator addresses for the known SF function, or to only some of these addresses. For example, for the network of FIG. 1, when the diagnosed node receives a message DIAG_RES (Service_Function_Map_Index=Chain_1, SF1), the node is informed of two Service_Function_Service_Locator addresses suitable for reaching a node associated with the function SF3. The new DIAG_REQ( ) message preferably encapsulates the original DIAG_REQ( ) message. The attributes of this new message are as follows:

Service_Function_Map_Index: this attribute is copied from the original DIAG_REQ( ) message;

Service_Function_Identifier: this is the identifier of the next SF function of the SFC as specified by the Service_Function_Map_Index attribute;

if a Recorded_Service_Function_Map attribute is present in the original request, the diagnosed node updates the Recorded_Service_Function_Map attribute with the identifier of the current SF function (i.e. it adds the identifier of the current SF function to the list described by the Recorded_Service_Function_Map attribute), and inserts it in the DIAG_REQ( ) message for sending to a node associated with the next SF function of the SFC.

For example, for the network of FIG. 1, when a node associated with the function SF1 receives a message DIAG_REQ(Service_Function_Map_Index=Chain 2, SF1), the node sends a message DIAG_REQ(Service_Function_Map_Index=Chain 1, SF6) to SF6.

In contrast, if the diagnosed node is associated with the last SF function of the SFC identified by the Service_Function_Map_Index attribute or the last SF function of the sequence (complying with the value of the Tail_SF attribute), the diagnosed node sends a DIAG_RES( ) message either to the source address of the DIAG_REQ( ) message encapsulated in the last DIAG_REQ( ) message if encapsulation is being used, or to the source address of the last DIAG_REQ( ) message. For example, for the network of FIG. 1, the node associated with the function SF6 sends a DIAG_RES( ) message on receiving the following message DIAG_REQ (Service_Function_Map_Index=Chain_2, SF6).

If all of the diagnostic operations have been performed successfully, this DIAG_RES( ) message is characterized as follows:

the attributes of the DIAG_REQ( ) request are copied with the exception of the Service_Function_Identifier attribute that should give the identifier of the last diagnosed SF function and the Recorded_Service_Function_Map attribute which should be updated as defined above; and STATUS attribute: set to "SUCCESS".

If the function identified by the Service_Function_Identifier attribute does not form part of the SFC identified by the Service_Function_Map_Index attribute, the diagnosed node sends a DIAG_RES( ) message to the diagnosing node. This DIAG_RES( ) message is characterized as follows:

the attributes of the DIAG_REQ( ) request are copied;

STATUS attribute: the value "FAIL" indicates that the diagnostic operation has failed; and Error_Code attribute: gives a "BAD_INDEX" error code.

If the Service_Function_Map_Index attribute is set to "0", that means that the diagnosed node needs to perform a diagnostic operation for all of the SFCs to which the SF function identified by the Service_Function_Identifier attribute belongs. If the diagnostic operations are performed successfully, the node then sends DIAG_REQ( ) messages to the or each of these next SF functions of all of the SFCs that include the SF function identified by the Service_

Function_Identifier attribute. The source address of each new message is the IP address of the diagnosed node. The destination address of the new message is the IP address of a node associated with the next SF function in the list identified by the Service_Function_Map_Index attribute for each list to which the SF function identified by the Service_Function_Identifier attribute belongs.

If a plurality of Service_Function_Service_Locator addresses can be used to reach the node associated with the next SF function in the list identified by the Service_Function_Map_Index attribute, the diagnosed node sends a plurality of DIAG_REQ( ) messages. The diagnosed node can send DIAG_REQ( ) messages to all of the known addresses of a node associated with the next SF function, or to only some of these addresses. Each new message preferably encapsulates the original DIAG_REQ( ) message. The attributes of this new DIAG_REQ( ) message are as follows:

Service_Function_Map_Index: deduced locally from a table of SF function chains;

Service_Function_Identifier: identifier of the next SF function in the SFC identified by the Service_Function_Map_Index attribute; and if a Recorded_Service_Function_Map attribute is present in the original request, the current SF function updates the Record_Service_Function_Map attribute with the identifier of the current SF function (i.e. it adds the identifier of the current SF function to the list contained in Recorded_Service_Function_Map), and inserts it into the DIAG_REQ( ) message sent to a node associated with the next SF function of the SFC.

For example, for the FIG. 1 network, when a node associated with the function SF1 receives a message DIAG_REQ(Service_Function_Map_Index=0, SF1), the node sends a DIAG_REQ( ) message to a node associated with the function SF3 (associated with the Chain_1 SFC) and to a node associated with the function SF6 (associated with the Chain_2 SFC).

If the SF function identified by the Service_Function_Identifier attribute is the last element of the SFC, a DIAG_RES( ) message is sent either to the source address of the DIAG_REQ( ) message encapsulated in the last DIAG_REQ( ) message if encapsulation is being used, or else to the source address of the last DIAG_REQ( ) message. For example, in the FIG. 1 network, when a node associated with the function SF6 receives a message DIAG_REQ (Service_Function_Map_Index=Chain_2, SF6) from the node that sent the original request, the node associated with the function SF6 sends a DIAG_RES( ) message to the node that sent the original request.

If an error is detected during the diagnosis, the diagnosed node sends a DIAG_RES( ) message either to the node that sent the last DIAG_REQ( ) message, or else to the node that sent the original request (i.e. if encapsulation is being used, to the source address of the DIAG_REQ( ) message encapsulated in the last DIAG_REQ( ) message). This DIAG_RES( ) message is characterized as follows:

the attributes of the DIAG_REQ( ) request are copied with the exception of the Service_Function_Identifier attribute that should give the identifier of the last SF function to be diagnosed and the Recorded_Service_Function_Map attribute which should be updated as defined above;

STATUS attribute: the value "FAIL" indicates that the diagnostic operation has failed; and Error_Code attribute: gives the error code (e.g. "NO_RESOURCES" if all of the resources of the diagnosed node are already in use).

Optionally, a node associated with an intermediate SF function that has successfully processed a DIAG_REQ( ) message received from a node associated with the preceding function, as specified in the characteristic map of the SFC to which these SF functions belong, can send a DIAG_RES( ) message to that node associated with the preceding function in order to inform it explicitly that the request has been processed successfully. During a retransmission procedure, the intermediate SF functions of an SFC can also manage the retransmission if this explicit notification procedure is activated.

In a second implementation of the invention, referred to as "SF mode", it is an SF function referred to as the "local" SF function that manages the diagnostic operation. These diagnostic operations are analogous to those performed by the PDP, as described above; for reasons of brevity, they are therefore not repeated below.

In particular, a local service function may verify whether:
another given SF function is operational;
a profile associated with a given SF function is operational; and
an SFC, or a sequence of SF functions within an SFC, is operational.

A local SF function can verify whether its neighbors within a given SFC are operational. When a local SF function uses a plurality of Service_Function_Service_Locator attributes to contact another SF function belonging to a given SFC, said local SF function can perform diagnostic operations in order to determine which Service_Function_Service_Locator attributes to use in order to contact said SFC function. The diagnostic message is then sent to all or only some of the IP addresses corresponding to the Service_Function_Service_Locator attributes associated with that other SF function.

For example, in the network of FIG. 1, the function SF1 may perform message operations:
concerning SF3 by sending the message: DIAG_REQ (Service_Function_Map_Index=Chain_1, SF3) associated with the Chain_1 SFC; and
concerning SF6 by sending the message: DIAG_REQ (Service_Function_Map_Index=Chain_2, SF6) associated with the Chain_2 SFC.

If SF6 is reachable at two different IP addresses, the result of the diagnosis using the message: DIAG_REQ (Service_Function_Map_Index=Chain_2, SF6) may be selected as a criterion for deciding which IP address should be used to transfer traffic to SF6 in association with the Chain_2 SFC.

As another example concerning the network of FIG. 1, the function SF3 may perform message operations concerning SF6 by means of the message: DIAG_REQ (Service_Function_Map_Index=Chain_3, SF6)

In a third implementation of the invention, the DIAG_REQ( ) diagnostic request relates to an ordered list of SF functions, without the SF functions of the list forming a sequence or a complete set of SF functions of an SFC installed in the IP domain.

Use is then made of an attribute referred to as "Service_Function_List", which gives an ordered list (referred to as List(Service_Function_Identifier)) of identifiers of SF functions or an ordered list (referred to as List(Service_Function_Locator)) of IP addresses of SF nodes. If the Service_Function_List attribute is used in a DIAG_REQ( ) diagnostic request, then the Service_Function_Map_Index should not be given in the same request. The DIAG_REQ( ) diagnostic request including the Service_Function_List attribute should be sent to the SF function corresponding to the first identifier (or to the first IP address as the case may be) given in the Service_Function_List list.

If the diagnostic operation is performed successfully, the DIAG_REQ( ) diagnostic request is then sent to the SF node associated with the next SF function of the Service_Function_List list. This procedure is reiterated until the last element of the List(Service_Function_Identifier) (or the list List(Service_Function_Locator), as the case may be).

The use of a list of SF function identifiers assumes that the SF functions can recover the Service_Function_Locator attribute corresponding to a certain SF function identified by a Service_Function_Identifier attribute. The information may be available locally to each SF node (in other words, the list of Service_Function_Locator attributes has been preconfigured); in a variant, each SF node may invoke a dedicated resolution service (e.g. the DNS service) in order to determine the Service_Function_Locator attribute corresponding to a Service_Function_Identifier attribute.

A first example showing this third embodiment is associated with the message DIAG_REQ(Service_Function_List(SF1, SF2, SF5)). The PDP sends this diagnostic request to a node associated with the function SF1. This node verifies whether its identifier is present in the list, and then recovers the identifier of the next "hop", i.e. the identifier for reaching the next SF node; in this example, this node needs to transfer the diagnostic request to a node that is associated with SF2. Once the request has been received by the node associated with SF2, that node verifies whether or not its identifier is present in the Service_Function_List list and also recovers the identifier of the following SF function in the list, i.e. SF5. Thereafter, a node associated with SF5 receives the diagnostic request, and deduces therefrom that it is the last SF node in the list, so it sends a response message to the PDP.

A second example illustrating this third implementation is associated with the message DIAG_REQ(Service_Function_List("1.2.3.4", "2.3.4.5", "3.4.5.6")). The PDP sends this diagnostic request to an SF node having the address "1.2.3.4". This SF node verifies whether one of its Service_Function_Locator attributes is present in the list, and then recovers the Service_Function_Locator attribute corresponding to the next "hop": in this example, the SF node is to transmit the diagnostic request to the address "2.3.4.5". Once the request has been received by the SF node having as its Service_Function_Locator attribute the address "2.3.4.5", that node verifies whether any of its Service_Function_Locator attributes are present in the Service_Function_List list, and also recovers the IP address for reaching the next SF node, i.e. the node having the address "3.4.5.6" as its Service_Function_Locator attribute. Thereafter, that node receives the diagnostic request and deduces therefrom that it is the last in the list, so it sends a response message to the PDP.

Figure 2:
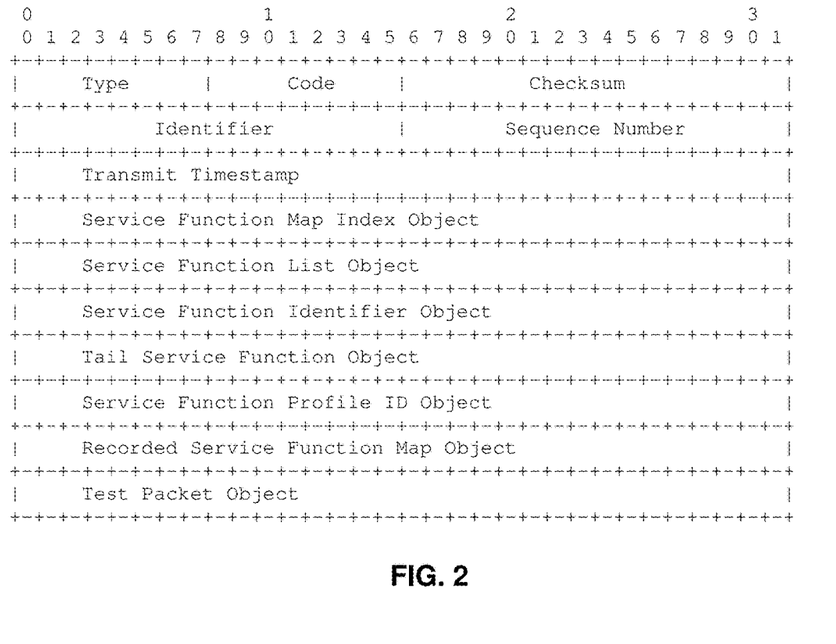
FIGS. 2 and 3 show respectively an SF Diag Request ICMP message format and an SF Diag Response ICMP message format, in a particular implementation of the invention.
Figure 3:
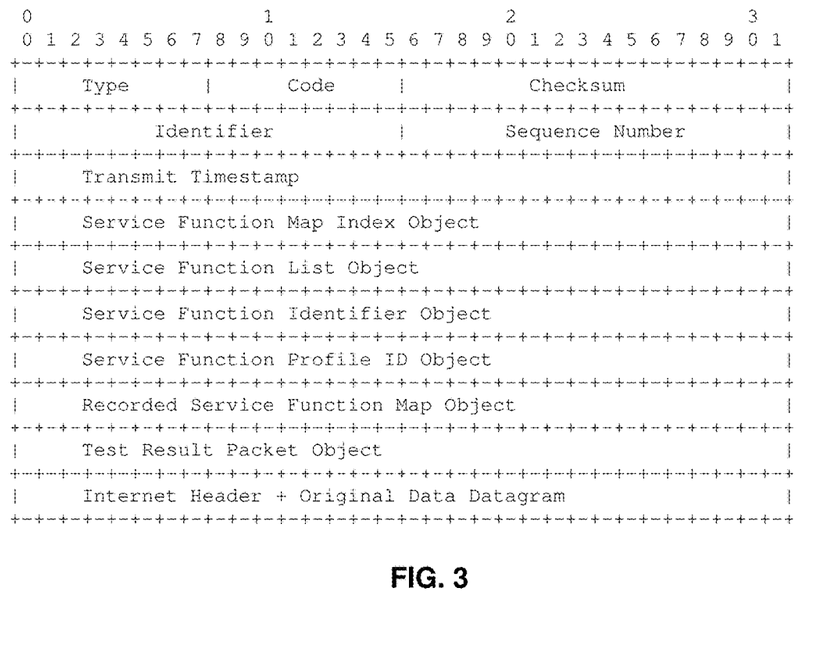

There follows a description of an implementation of the invention in which use is made of the resources of the ICMP protocol. In this context, two new ICMP messages are defined:

ICMP SF Diag Request: this message is an implementation of the above-defined DIAG_REQ( ) message; the format of this message is shown in FIG. 2; and ICMP SF Diag Response: this message is an implementation of the above-defined DIAG_RES( ) message; the format of this message is shown in FIG. 3.

Figure 4:
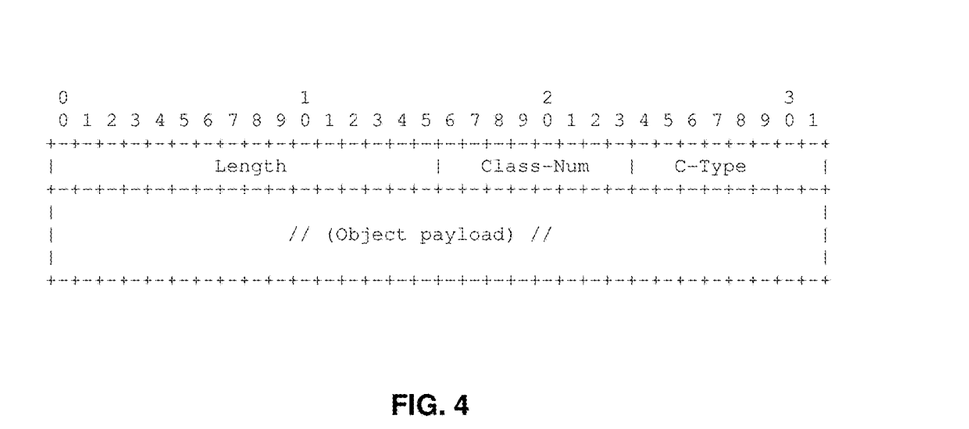
FIG. 4 shows a conventional format for an ICMP object.

FIGS. 2 and 3 show objects that can be used by these ICMP messages. These objects satisfy a format in compliance with IETF document RFC 4884, as shown in FIG. 4.

The fields of the ICMP SF Diag Request message shown in FIG. 2 are as follows:

Type, Code, Checksum, Identifier, and Sequence_Number are described in IETF document RFC 792;

Transmit_Timestamp: this object gives the Timestamp for when the request was sent;

Service_Function_Map_Index: this object gives the identifier of the SFC; this attribute is optional;

Service_Function_List: this object gives an ordered list of SF functions; this attribute is optional;

Service_Function_Identifier: this object gives the identifier of the SF function; this attribute is optional;

Tail Service Function: this object gives the identifier of the last SF function involved by the diagnostic operation; this attribute is optional;

Service_Function_Profile_ID: this object gives the identifier of a configuration profile of an SF function; this attribute is optional; the diagnostic message may contain a plurality of profile identifiers;

Test_Packet: this object is optional; it is used for including a test packet in order to verify the classification rules, to correlate the classification rules with traffic transfer decisions, or to perform other diagnostic operations such as those implemented locally by the SF functions; and Recorded_Service_Function_Map: this object is optional; this attribute gives an ordered list of the identifiers of the SF functions through which a diagnostic message has passed.

The fields of the ICMP SF Diag Response message shown in FIG. 3 are as follows:

Type, Code, Checksum, Identifier, and Sequence_Number are described in above-mentioned document RFC 792;

Transmit_Timestamp: this object gives the Timestamp for when the request was sent;

Service_Function_Map_Index: this object gives the identifier of the SFC; this attribute is optional;

Service_Function_List: this object gives an ordered list of SF functions; this attribute is optional;

Service_Function_Identifier: this object gives the identifier of the SF function; this attribute is optional;

Service_Function_Profile_ID: this object gives the identifier of a configuration profile of an SF function; this attribute is optional; if this attribute is given, the diagnostic message should also include the Service_Function_Identifier attribute; the diagnostic message may contain a plurality of profile identifiers;

Recorded_Service_Function_Map: this object is optional; this attribute gives the ordered list of the identifiers of the SF functions through which a diagnostic message has passed;

Test_Result_Packet: this object is optional; it gives the result of executing the SF function on the test packet; and Internet Header+Original Data Datagram: this object includes the original ICMP SF Diag Request message, including the IP header.

To terminate, it should be observed that the invention may be implemented within PDP nodes and SF nodes of an IP domain by means of software and/or hardware components.

The software components may be incorporated in a conventional computer program for managing a network node. That is why, as mentioned above, the present invention also relates to a computer system. The computer system comprises in conventional manner a central processor unit that uses signals to control a memory, and also an input unit and an output unit. In addition, the computer system may be used for executing a computer program including instructions for performing any of the service function message methods of the invention.

Specifically, the invention also provides a computer program that is downloadable from a communications network and that comprises instructions for executing steps of a service function message method of the invention when it is executed on a computer. The computer program may be stored on a computer readable medium and it may be executable by a microprocessor.

The program may use any programming language, and it may be in the form of source code, object code, or code intermediate between source code and object code, such as in a partially compiled form, or in any other desirable form.

The invention also provides a data medium that may be non-removable, or that is partially or totally removable, that is readable by a computer, and that includes instructions of a computer program as mentioned above.

The data medium may be any entity or device capable of storing the program. For example, the medium may comprise storage means such as a read only memory (ROM), e.g. a compact disk (CD) ROM, or a microelectronic circuit ROM, or magnetic recording means such as a hard disk, or indeed a universal serial bus (USB) flash drive.

Furthermore, the data medium may be a transmissible medium such as an electrical or optical signal, suitable for being conveyed via an electrical or optical cable, by radio, or by other means. The computer program of the invention may in particular be downloaded from an Internet type network.

In a variant, the data medium may be an integrated circuit in which the program is incorporated, the circuit being adapted to execute or to be used in the execution of any of the service function diagnostic methods of the invention.

Although the present disclosure has been described with reference to one or more examples, workers skilled in the art will recognize that changes may be made in form and detail without departing from the scope of the disclosure and/or the appended claims.

The invention claimed is:

1. A diagnostic method comprising:
diagnosing service functions in an IP domain comprising at least one node, referred to as a policy decision point (PDP) node, that is responsible for taking decisions relating to structuring of a service function chain, which is an ordered set of service functions, referred to as SF functions, defining a sequence for processing a data stream, and for notifying these decisions to other nodes of said IP domain, and at least one node, referred to as an SF node, associated with at least one SF function of the set hosted by said SF node or accessible via said SF node, wherein the diagnosing comprises the following acts:
a node, of the IP domain referred to as a diagnosing node, sends a request to an SF node of the IP domain, referred to as a diagnosed node, concerning an SF function of the set, referred to as a diagnosed function, wherein the diagnosed function is identified in the request and/or is the only SF function associated with said diagnosed node;
the diagnosed node forms at least one diagnostic operation concerning said diagnosed function, the diagnostic operation diagnosing proper operation or non-availability of the diagnosed function; and
the diagnosed node sends a response to said diagnosing node, said response including at least an indication of success or failure of the diagnostic operation or of non-operation or malfunction of the diagnosed function.

2. The diagnostic method according to claim 1, wherein said diagnosing node is a PDP node.

3. The diagnostic method according to claim 1, wherein said diagnosing node is an SF node.

4. A diagnostic method comprising:
diagnosing service functions in an IP domain comprising at least one node, referred to as a policy decision point (PDP) node, that is responsible for taking decisions relating to structuring of a service function chain, which is an ordered set of service functions, referred to as SF functions, defining a sequence for processing a data stream, and for notifying these decisions to other nodes of said IP domain, and at least one node, referred to as an SF node, associated with at least one SF function of the set hosted by said SF node or accessible via said SF node, wherein the diagnosing comprises:
a network node of the IP domain, referred to as a diagnosing node, sends a diagnostic request comprising at least one identifier, referred to as a list identifier, identifying an ordered list of identifiers of SF functions or of IP addresses of SF nodes, and
the following iterative acts:
a node of the IP domain, referred to as a diagnosed node, associated with an SF function, referred to as a diagnosed function, forming part of said ordered list, receives a request comprising at least said list identifier;
the diagnosed node forms at least one diagnostic operation concerning said diagnosed function, the diagnostic operation diagnosing proper operation or non-availability of the diagnosed function; and
if said diagnostic operation is performed successfully, the diagnosed node sends a request comprising at least said list identifier to an SF node of the IP domain associated with the following SF function in said ordered list to the diagnosed function, and:
if a diagnostic operation fails, or reveals that the diagnosed SF function is not operational, the diagnosed node sends a response including at least an indication of failure of the diagnostic operation, or of non-operation or malfunction of the diagnosed function; or
if in contrast all of the diagnostic operations are performed successfully, the diagnosed node associated with the last SF function of the ordered list sends a response including at least a successful diagnosis result.

5. The diagnostic method according to claim 4, wherein said diagnosing node is a PDP node.

6. The diagnostic method according to claim 4, wherein said diagnosing node is an SF node.

7. A diagnostic method comprising
diagnosing service functions in an IP domain comprising at least one node, referred to as a policy decision point (PDP) node, that is responsible for taking decisions relating to structuring of a service function chain, which is an ordered set of service functions, referred to as SF functions, defining a sequence for processing a data stream, and for notifying these decisions to other nodes of said IP domain, and at least one node, referred to to as an SF node, associated with at least one SF function hosted by said SF node or accessible via said SF node, wherein the diagnosing comprises:

a network node of the IP domain, referred to as a diagnosing node, sends a diagnostic request comprising at least one identifier of the SF function chain, referred to as a SFC, and optionally together with an identifier, referred to as an end-of-sequence identifier, identifying an SF function of the set, terminating a sequence included in said SFC, and the following iterative acts:

a node of the IP domain, referred to as a diagnosed node, associated with an SF function of the set, referred to as a diagnosed function, forming part of said SFC or said sequence, where appropriate, receives a request comprising at least said identifier of the SFC, and said end-of-sequence identifier, where appropriate;

the diagnosed node forms at least one diagnostic operation concerning said diagnosed function, the diagnostic operation diagnosing proper operation or non-availability of the diagnosed function; and if said diagnostic operation is performed successfully, the diagnosed node sends a request comprising at least the identifier of the SFC, and the end-of-sequence identifier, where appropriate to an SF node of the IP domain associated with the following SF function in the SFC to the diagnosed function, and:

if a diagnostic operation fails, or reveals that the diagnosed SF function is not operational, the diagnosed node sends a response including at least an indication of failure of the diagnostic operation, or of non-operation or malfunction of the diagnosed function; or if in contrast all of the diagnostic operations are performed successfully, the diagnosed node associated with the last SF function of the SFC or, where appropriate, with the SF function identified by the end-of-sequence identifier, sends a response including at least a successful diagnosis result.

8. The diagnostic method according to claim 7, wherein said diagnosing node is a PDP node.

9. The diagnostic method according to claim 7, wherein said diagnosing node is an SF node.

10. A node referred to as a diagnosing node and comprising:

an input unit and an output unit connected in a network of an IP domain comprising at least one node, referred to as a policy decision point (PDP) node, that is responsible for taking decisions relating to structuring of a service function chain which is an ordered set of service functions, referred to as SF functions, defining a sequence for processing a data stream, and for notifying these decisions to other nodes of said IP domain, and at least one node, referred to as an SF node, associated with at least one SF function hosted by said SF node or accessible via said SF node;

means for sending a diagnostic request to an SF node of the IP domain, referred to as a first diagnosed node, associated with an SF function of the set, referred to as a first diagnosed function; and means for receiving a response from an SF node of the IP domain, referred to as a last diagnosed node, associated with an SF function of the set, referred to as a last diagnosed function, said response including at least an indication of success or failure of a diagnostic operation that diagnoses proper operation or non-availability of the diagnosed function or of non-operation or malfunction of said last diagnosed function.

11. The diagnosing node according to claim 10, wherein:
said first and last diagnosed nodes are identical;
said first and last diagnosed functions are identical; and
the diagnosed SF function is identified in the request and/or is the only SF function associated with the diagnosed node.

12. The diagnosing node according to claim 10, wherein:
said diagnostic request includes at least one identifier, referred to as a list identifier, identifying an ordered list of SF function identifiers or of IP address of SF nodes; and
said first and last diagnosed functions form part of said ordered list.

13. The diagnosing node according to claim 10, wherein:
said diagnostic request includes at least one identifier of a chain of SF functions, referred to as SFC, optionally together with an identifier referred to as an end-of-sequence identifier that identifies an SF function terminating a sequence included in said SFC; and
said first and last diagnosed functions form part of said SFC, and where appropriate of said sequence.

14. The diagnosing node according to claim 10 wherein the diagnosing node is a PDP node.

15. The diagnosing node according to claim 10 wherein the diagnosing node is an SF node.

16. A node referred to as a diagnosed node and comprising:

an input unit and an output unit connected in an IP domain comprising at least one node, referred to as a policy decision point (PDP) node, that is responsible for taking decisions relating to structuring of a service function chain, which is an ordered set of service functions, referred to as SF functions, defining a sequence for processing a data stream, and for notifying these decisions to other nodes of said IP domain, and at least one node, referred to as an SF node, associated with at least one SF function of the set hosted by said SF node or accessible via said SF node, wherein said diagnosed node is an SF node;

means for receiving from a node of the IP domain a diagnostic request concerning an SF function of the set, referred to as a diagnosed function, associated with said diagnosed node; and means for performing at least one diagnostic operation concerning said diagnosed function, the diagnostic operation diagnosing proper operation or non-availability of the diagnosed function.

17. The diagnosed node according to claim 16, wherein the diagnosed node further comprises means for sending a response comprising at least an indication of success or failure of the diagnostic operation, or of non-operation or malfunction of said diagnosed SF function.

18. The diagnosed node according to claim 16, wherein the diagnosed node also comprises means for transmitting said diagnostic request to another SF node of the IP domain associated with an SF function specified in the diagnostic request.

19. A system for diagnosing service functions, the system comprising:

at least one diagnosing node in an IP domain comprising at least one node, referred to as a policy decision point (PDP) node, that is responsible for taking decisions relating to structuring of a service function chain, which is an ordered set of service functions, referred to as SF functions, defining a sequence for processing a data stream, and for notifying these decisions to other nodes of said IP domain, and at least one node, referred to as an SF node, associated with at least one SF function of the set hosted by said SF node or accessible via said SF node, wherein, each diagnosing node comprises:
    means for sending a diagnostic request to an SF node of the IP domain, referred to as a first diagnosed node, associated with an SF function of the set, referred to as a first diagnosed function; and
    means for receiving a response from an SF node of the IP domain, referred to as a last diagnosed node, associated with an SF function of the set, referred to as a last diagnosed function, said response including at least an indication of success or failure of a diagnostic operation that diagnoses proper operation or non-availability of the diagnosed function or of non-operation or malfunction of said last diagnosed function; and
  at least one diagnosed node, including the first and last diagnosed nodes, which may be identical to or different from one another, the first diagnosed node comprising:
    means for receiving from the at least one diagnosing node the diagnostic request concerning the SF function, referred to as the first diagnosed function, associated with said first diagnosed node; and
    means for performing the diagnostic operation concerning said first diagnosed function.

20. A non-transitory computer-readable data storage medium including computer program code instructions stored thereon for executing a service function diagnostic method when the instructions are executed by a processor of a diagnosing node, wherein the instructions configure the diagnosing node to perform acts of:
  diagnosing at least one service function in an IP domain comprising at least one node, referred to as a policy decision point (PDP) node, which is responsible for taking decisions relating to structuring of a service function chain, which is an ordered set of service functions, referred to as SF functions, defining a sequence for processing a data stream, and for notifying these decisions to other nodes of said IP domain, and at least one node, referred to as an SF node, associated with at least one SF function hosted by said SF node or accessible via said SF node, wherein the diagnosing comprises:
  the diagnosing node sending a diagnostic request to an SF node of the IP domain, referred to as a first diagnosed node, associated with an SF function of the set, referred to as a first diagnosed function; and
  the diagnosing node receiving a response from an SF node of the IP domain, referred to as a last diagnosed node, associated with an SF function of the set, referred to as a last diagnosed function, said response including at least an indication of success or failure of a diagnostic operation that diagnoses proper operation or non-availability of the diagnosed function or of non-operation or malfunction of said last diagnosed function.

21. A non-transitory computer-readable data storage medium comprising computer program code instructions stored thereon for executing a service function diagnostic method when the instructions are executed by a processor of a diagnosed node, wherein the instructions configure the diagnosed node to perform acts of:
  diagnosing at least one service function in an IP domain comprising at least one node, referred to as a policy decision point (PDP) node, which is responsible for taking decisions relating to structuring of a service function chain, which is an ordered set of service functions, referred to as SF functions, defining a sequence for processing a data stream, and for notifying these decisions to other nodes of said IP domain, and at least one node, referred to as an SF node, associated with at least one SF function hosted by said SF node or accessible via said SF node, wherein the diagnosing comprises:
  the diagnosed node receiving from a node of the IP domain a diagnostic request concerning an SF function of the set, referred to as a diagnosed function, associated with said diagnosed node; and
  the diagnosed node performing at least one diagnostic operation concerning said diagnosed function, the diagnostic operation diagnosing proper operation or non-availability of the diagnosed function.

\* \* \* \* \*